United States Patent [19]

Lea

[11] Patent Number: 5,543,830
[45] Date of Patent: Aug. 6, 1996

[54] APPARATUS WITH LIGHT EMITTING ELEMENT, MICROLENS AND GRADIENT INDEX LENS CHARACTERISTICS FOR IMAGING CONTINUOUS TONE IMAGES

[75] Inventor: Michael C. Lea, St. Paul, Minn.

[73] Assignee: Minnesota Mining and Manufacturing Company, St. Paul, Minn.

[21] Appl. No.: 161,973

[22] Filed: Dec. 3, 1993

Related U.S. Application Data

[63] Continuation of Ser. No. 596,861, Oct. 12, 1990, abandoned.

[51] Int. Cl.$^6$ .................... B41J 2/435; B41J 2/45
[52] U.S. Cl. .................... 347/241; 347/244; 347/238
[58] Field of Search .................... 346/107 R; 181/176; 359/619, 621, 623, 900, 40; 347/137, 244, 241, 238, 134, 130

[56] References Cited

U.S. PATENT DOCUMENTS

| | | | |
|---|---|---|---|
| 3,827,062 | 7/1974 | Mailloux | 355/4 |
| 4,096,486 | 6/1978 | Pfeifer et al. | 346/107 R |
| 4,318,587 | 3/1982 | Grassl | 350/96.2 |
| 4,318,597 | 3/1982 | Kotani et al. | 354/5 |
| 4,428,647 | 1/1984 | Sprague et al. | 359/619 |
| 4,435,064 | 3/1984 | Tsukada et al. | 355/1 |
| 4,447,126 | 5/1984 | Heidrich et al. | 355/1 X |
| 4,536,778 | 8/1985 | De Schamphelaere et al. | 346/107 R X |
| 4,589,745 | 5/1986 | Plummer | 354/4 |
| 4,706,130 | 11/1987 | Yamakawa | 358/296 |
| 4,734,734 | 3/1988 | Yano | 346/107 R X |
| 4,790,632 | 12/1988 | Miyakawa et al. | 350/334 X |
| 4,884,079 | 11/1989 | Inoue et al. | 346/1.1 |
| 4,980,700 | 12/1990 | Ng | 346/1.1 |

FOREIGN PATENT DOCUMENTS

| | | | |
|---|---|---|---|
| 0140529 | 8/1985 | European Pat. Off. | G02B 27/10 |
| 0196006 | 1/1986 | European Pat. Off. | G03G 15/32 |
| 60-175065 | 9/1985 | Japan | G03G 15/04 |
| 1-018659 | 1/1989 | Japan | 347/130 |
| 64-84758 | 3/1989 | Japan | H01L 33/00 |

OTHER PUBLICATIONS

Patent Abstracts of Japan, vol. 6, No. 137 (P–130) (1015) 24 Jul. 1982 & JP–A–57 060 354 (Ricoh) 12 Apr. 1982 *abstract*.
Patent Abstracts of Japan, vol. 7, No. 59 (M–199) (1204) 11 Mar. 1983 & JP–A–57 203 569 (Nippon Denshin Denwa Kosha) 13 Dec. 1982 *abstract*.
Computer Systems, vol. 6, No. 10, Oct. 1986, Bromley, Great Britian, pp. 51–53.

*Primary Examiner*—Benjamin R. Fuller
*Assistant Examiner*—David Yockey
*Attorney, Agent, or Firm*—Gary L. Griswold; Walter N. Kirn; Steven J. Shumaker

[57] ABSTRACT

Method and apparatus for forming grey-scale images on a photosensitive imaging medium, the medium being capable of spatial resolution finer than pixel dimensions of the exposing apparatus. The medium is exposed to a pixellated array of exposure sources which may be liquid crystal shutters or light emitting diodes. A transmission density is developed in imaged areas that varies non-linearly with the exposure energy received by the imaged areas in which the exposure conditions are adjusted such that the variation in average transmission over a whole pixel area from image pixel to image pixel caused by spatial energy distribution variations is less than 5% for the same energy delivered to each pixel area. The pixellated array of energy sources may be two rows of exposure pixels in a parallel but staggered configuration and associated with a SELFOC lens array, each of the exposure pixels having a light-emitting area, in which light-emitting areas of one of the two rows are substantially the same size and shape as gaps between light-emitting areas of the other of the two rows. The pixellated array may also be a single row of exposure pixels associated with an array of microlenses and the SELFOC lens array, arranged so that the expression:

$$a/2 - f \tan$$

is greater than zero, where f= focal length of a microlens, a=width of an exposure pixel, and = acceptance angle of the SELFOC lens array.

5 Claims, 2 Drawing Sheets

APPARATUS WITH LIGHT EMITTING ELEMENT, MICROLENS AND GRADIENT INDEX LENS CHARACTERISTICS FOR IMAGING CONTINUOUS TONE IMAGES

This is a continuation of application Ser. No. 595,861 filed Oct. 12, 1990 now abandoned.

BACKGROUND OF THE INVENTION

This invention relates to the production of grey scale images using pixellated exposure devices such as an array of light emitting diodes (LEDs) or liquid crystal shutters.

Electronic image recording apparatus of a type comprising a line exposure array stationed in light exposing relationship to a photosensitive material and comprising a plurality of linearly spaced apart light emitting diodes are well known in the art. Means are generally provided for effecting a relative displacement between the light exposure array and the photosensitive material in a direction transverse to the longitudinal axis of the exposure array so as to effect an exposure of the entire surface of the photosensitive material.

Line exposure arrays of the aforementioned type comprising a plurality of light emitting diodes aligned in spaced apart relation along the longitudinal axis thereof generally provide for a nonuniform line exposure as a result of those portions of the photosensitive material immediately opposite the areas between the light emitting diodes receiving substantially less exposure than those areas of the photosensitive material immediately opposite the light emitting diodes. This non uniform line exposure results in visible underexposed stripes extending across the photosensitive material in the direction of relative displacement between the photosensitive material and the line exposure array. The visibility of such stripes can be reduced but not entirely eliminated by minimising the spacing between the light emitting diodes. The degree to which the spacing between the light emitting diodes can be minimised, however, is limited by practical constraints since adjacent light emitting diodes must also be insulated from each other. This insulation requirement results in a minimum degree of spacing between the light emitting diodes being required thereby making it impossible to entirely eliminate some minimum degree of spacing between the diodes.

It has been proposed to eliminate "unexposed lines" caused by the spacing of LEDs by oscillating the LED head; arranging the LEDs in separate rows which are combined electronically as disclosed, for example, in U.S. Pat. Nos. 3,827,062, 4,096,486, and 4,435,064 and Japanese Patent No. 60-175065; the particular selection of the LED element shape as disclosed, for example, in U.S. Pat. Nos. 4,435,064 and 4,589,745 and the use of Selfoc lens arrangements in combination with LEDs as disclosed, for example, in U.S. Pat. Nos. 4,318,587 and 4,447,126.

One can distinguish two types of imaging using LED bars, namely bi-level and continuous tone imaging. In the former, each pixel of the photosensitive medium experiences either maximum or zero exposure by an element of the LED array, and the image comprises dots of maximum optical density on a background of minimum optical density. In contrast, continuous tone imaging requires that each pixel receive an exposure that is continuously variable, or variable over a sufficiently large number of discrete levels as to mimic a continuous variation. The latter type of imaging is needed in areas such as high-quality colour reproduction and requires control of the exposure parameters with a degree of precision not achieved in the prior art, in turn, involving the solution of problems not recognised in the prior art. These include transient turn on-and-off effects, source wavelength variation effects and pixel shape and spacing effects, which are addressed by the present invention.

The prior art has mostly involved bi-level imaging, and has been concerned primarily with eliminating element-to-element variations in the output energy of the exposing device, and to minimising unexposed gaps between the elements. For the purposes of continuous tone imaging, especially on high-resolution media such as silver halide films, it is found that much more sophisticated controls and compensations are necessary. What is ultimately important is the developed density in the imaging media as perceived by the human eye, and this is a function of the exposure energy density experienced by the media. For media such as silver halide films, it is a non-linear function. In practice, the eye can detect deviations in transmission density of 1% or perhaps even somewhat less. The methods and apparatus of the prior art do not give this level of precision. When attempts are made to image silver halide film in continuous tone using a linear LED array, the resulting images are frequently distorted by the presence of lines of high or low density running in the direction perpendicular to the long axis of the array. The problem can be traced to non-uniformities in the energy density experienced by the film on a microscopic scale (i.e., over areas too small to be resolved by the human eye), combined with the non-linear relationship of exposure energy to image density.

SUMMARY OF THE INVENTION

According to the present invention there is provided a method of forming grey-scale images on a photosensitive imaging medium by means of an exposing apparatus comprising a pixellated array of exposure sources, said imaging medium being capable of a spatial, resolution finer than the pixel dimensions of the exposing apparatus, and developing a transmission density in imaged areas that varies non-linearly with the exposure energy received by said imaged areas, in which the exposure conditions are adjusted such that the variation in average transmission over a whole pixel area from image pixel to image pixel caused by spatial energy distribution variations is less than 5% for the same energy delivered to each pixel area.

The variation in average transmission over a whole pixel area from image pixel to image pixel is preferably less than 1%

The invention provides a method of grey-scale imaging in which the exposure conditions of the photosensitive medium are controlled to avoid major intensity variations within individual image pixels and between adjacent pixel images when the same energy is delivered to each pixel area. Preferable the ratio of maximum to minimum intensity of illumination of points within an individual image pixel area is not more than 2:1 and preferably is about 1:1, i.e., substantially uniform intensity throughout the image pixel.

BRIEF DESCRIPTION OF THE DRAWINGS

The unexposed areas around an LED image make the final perceived density critically dependent on the energy distribution within and around the core of the image. This may be illustrated by considering the simple case of a pixel image area A adjacent to an equal unexposed area B and considering how the combined transmission of the two areas varies with the distribution of a fixed amount of energy.

The eye cannot resolve the two areas and simply sees the combined transmission. The calculations have used the measured D/log E curve of the laser imager film commercially available from Minnesota Mining and Manufacturing Company under the Trade Mark 3M SX560 and a total exposure of 50 ergs/cm$^2$. The following Table shows the results of two energy distributions:

(i) area A 50 ergs/cm$^2$, area B 0 ergs/cm$^2$
(ii) area A 45 ergs/cm$^2$, area B 5 ergs/cm$^2$

| Perceived Density Produced By An Exposed Area Adjacent To An Unexposed Area | | | | |
|---|---|---|---|---|
| Area A | | Area B | | Total |
| exposure erg/cm$^2$ | transmission % | exposure erg/cm$^2$ | transmission % | transmission % |
| 50 | 0.566 | 0 | 70.8 | 35.68 |
| 45 | 0.736 | 5 | 50.12 | 25.43 |

Thus, if 10% of the energy is shifted from A to B, the combined transmission of the two areas changes by 29%. The change is due almost entirely to the different exposure in area B. Thus, arranging for uniform energies in the LED images is not sufficient to guarantee uniform film density. If there are unexposed areas within the individual image pixels then any variation in image energy distribution will lead to variations in perceived density.

Although this is a simple model it closely reflects the actual situation for LED bars in which the high intensity image of the LED emitting area is surrounded by an area of low intensity. Imperfections in the imaging lens then cause various amounts of energy to leak into the surrounding low intensity area. The eye cannot resolve the two areas and simply sees the combined transmission.

Figure 1:
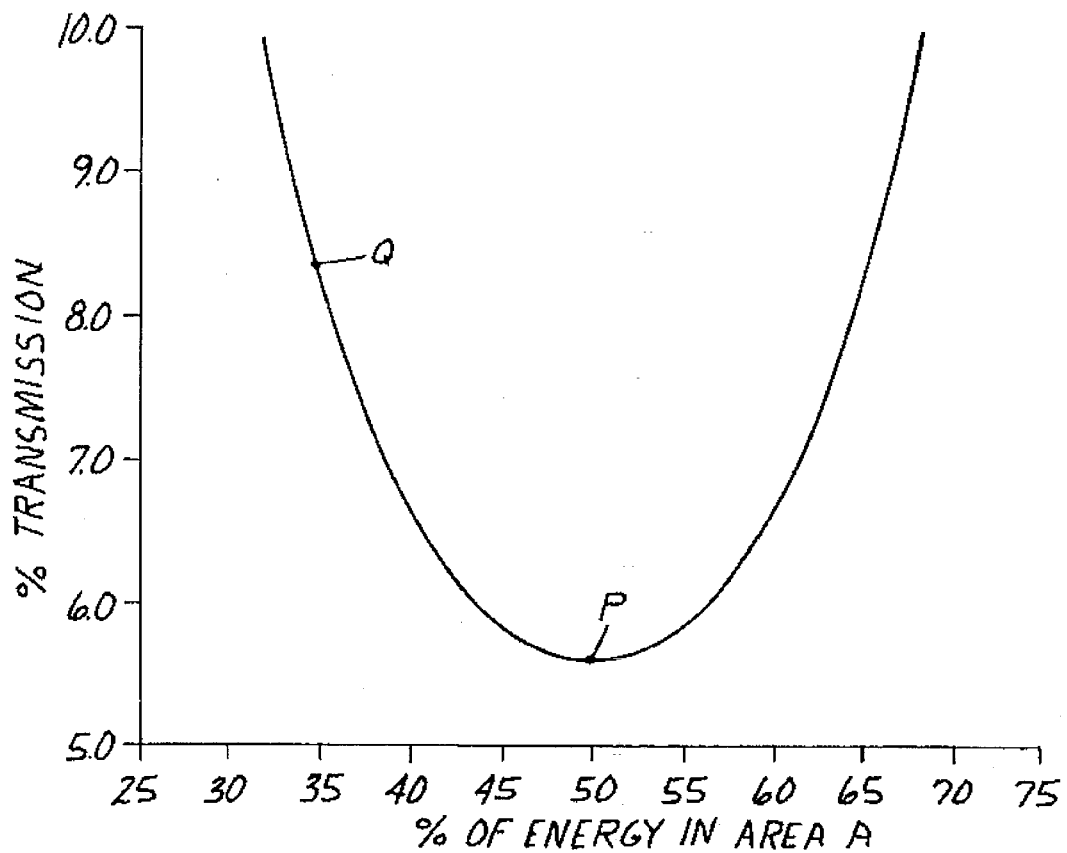

FIG. 1 of the accompanying drawings shows a plot of the combined transmission of the two areas as a function of the percentage of the energy delivered to area A (the remaining energy being delivered to area B).

The calculations have used the measured D/log E curve of 3M SX560 film described above, and have assumed a total exposure of 20 ergs/cm$^2$.

Clearly, the optimum energy distribution is represented by point P where the perceived transmission is least sensitive to variations in the energy distribution. Point P represents completely uniform exposure when A and B receive equal amounts of energy. The energy split may vary from 50/50 to approximately 60/40 before the transmission changes by 1%.

However at point Q, the energy split can vary only from 35/65 to about 33/67 before a 1% change in transmission occurs. Thus, it is required that the energy distribution within each pixel area be the same for all pixels, or, failing that, in order to minimise the effects of variations from pixel to pixel, the distribution within each pixel should be as uniform as possible.

This simple model may be easily extended to the general case of a continuous distribution of intensity within the pixel area.

The energy distribution in the region of an image is affected by several factors including: aberrations of the imaging optics, distortion of the imaging optics (producing shifts in image position), LED element shape and LED spacing.

The LED and Selfoc lens arrangement of the prior art has hitherto given the best uniformity of intensity at the image plane. A Selfoc lens array consists of two rows of individual gradient index lenses in a hexagonal close packed arrangement. Each lens is a cylindrical rod of glass with a radial refractive index gradient and a diameter of about 1 mm. Light rays follow curved paths through the material. The gradient and length are adjusted to produce a lens with a magnification of +1. In an array, each lens produces its own image of an object. It is only in the case of +1 magnification that the individual images coincide, allowing the use of an array.

Thus, any one object point (any LED) is imaged by many individual lenses. In the case of the commercially available SLA20 Selfoc lens, the acceptance angle is approximately 20 degrees so that each LED is imaged by three rod lenses. Equally, each lens images many LEDs, for example, in an arrangement comprising an SLA20 and a 300 dots per inch (dpi) bar, each lens contributes to the images of about 30 LEDs.

The individual lenses suffer from aberrations, and just as with conventional lenses the imaging is better on axis than off. The image of an LED which happens to lie on the axis of a lens would be sharper than one which lies between two lenses. However, in practice, all of the LEDs are off axis by varying amounts. More importantly, the depth of focus varies with position, being deeper on the axis of the lenses than between lenses. When the Selfoc lens is properly focussed there is no significant variation in image quality from LED image to LED image. As the system is defocused, the images near the axes of the individual lenses degrade more slowly than those further away, producing a periodic variation in image quality, i.e., there is a differential defocus effect. Thus, the known arrangement may lead to periodic energy density variations at the image plane.

Figure 2:
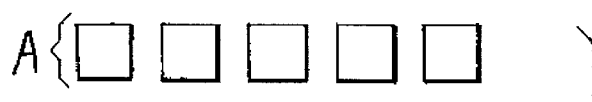
Figure 2:
Figure 2:
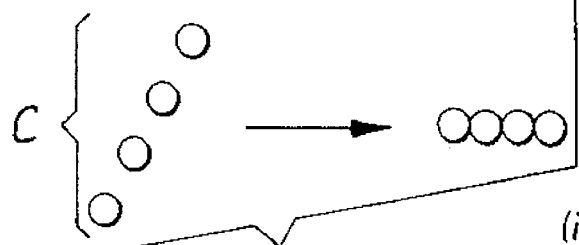

The effect of pixel shapes and arrangement have been studied using three different LED bars in combination with a Selfoc lens arrangement to image a silver halide film. FIG. 2 of the accompanying drawings represents diagrams of the arrangement of the light emitting areas of the three bars.

The specification of the 3 bars are as follows:
Bar A Model XLH2200 commercially available from Oki, 300 dpi emitting at 740 nm,
Bar B Model HLB440A commercially available from Hitachi, 400 dpi emitting at 770 nm,
Bar C 600 dpi emitting at 660 nm.

Bar B exhibited a very severe differential defocus effect which limited the depth of focus to +/−50 microns. Beyond this value there was a visible periodic variation in the density developed in the film at the Selfoc frequency of 1 cycle/mm.

Bar A exhibited a similar effect but to a much lesser extent and at much greater defocus distances. The depth of focus of Bar A is limited more by the conventional criterion of image blurring, and is about +/−200 microns. Since the two bars use the same type of Selfoc lens, this confirms the theory that unexposed areas are causing these problems, the pixels of Bar B being surrounded by a lot more empty space.

Figure 3:
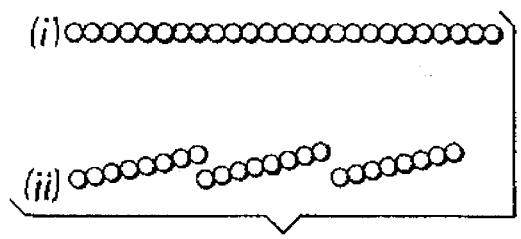

Bar C exhibited a separate defocus effect that is caused by its stagger arrangement. FIG. 3 of the accompanying drawings shows the image of a horizontal line (i) with the Selfoc lens in focus, and out of focus (ii). Out of focus, the line breaks up into segments, with each segment corresponding to one stagger of eight pixels. One of the effects of defocus is to shift an image from its correct position, depending on the distance of the LED from the central axis of the Selfoc array. With the Bars A and B all the LEDs are in a line, but in Bar C the LEDs at the ends of the stagger are 300 microns from the Selfoc axis, causing this segmentation of horizontal lines. The conclusion is that large staggers cannot be tolerated.

Since film responds to energy density, the LED spacing is a critical factor in the final image density. Within a chip the spacings are determined by the lithographic fabrication process and are consequently very finely controlled. However, LED bars are invariably an assembly of a number of individual chips. The LED to LED spacings at the chip boundaries are determined by the positioning and bonding process by which the chips are assembled on a common substrate, and typically have errors of 10 µm. These errors have been seen on Bar A and result in lines down an image. To obtain an exposure uniformity of 1% requires a similar uniformity in LED spacing, which implies a tolerance of less than a micron which is extremely severe.

In addition there may also be periodic spacing errors produced by defocus.

It is apparent that the energy distribution within and around the image in the known apparatus for bi-level printing application is not sufficiently uniform for grey scale applications.

The degree to which the perceived density varies with the presence of "dead space" within and around individual LEDs can be modelled mathematically. The theoretical optimum arrangement for the pixellated exposure array, e.g., LED array, is to have pixels which are solid and which abut up against each other with no gaps.

Figure 4:
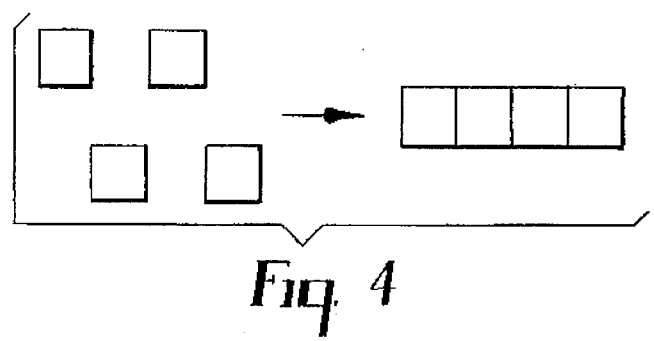

This is impossible for a single line of LEDs and the best compromise is achieved by a staggered arrangement as shown in FIG. 4 of the accompanying drawings. The test results from Bar C indicate that larger staggered arrangements lead to problems. The squares in FIG. 4 represent the light-emitting portions of the LED bar. While this represents the simplest embodiment showing the desired effect, it will be appreciated that many other shapes are possible for the light-emitters, e.g., rectangles, rhombuses, triangles etc. All that matters is that the elements of one row fit as precisely as possible in the gaps between the elements of the other row.

Figure 5:
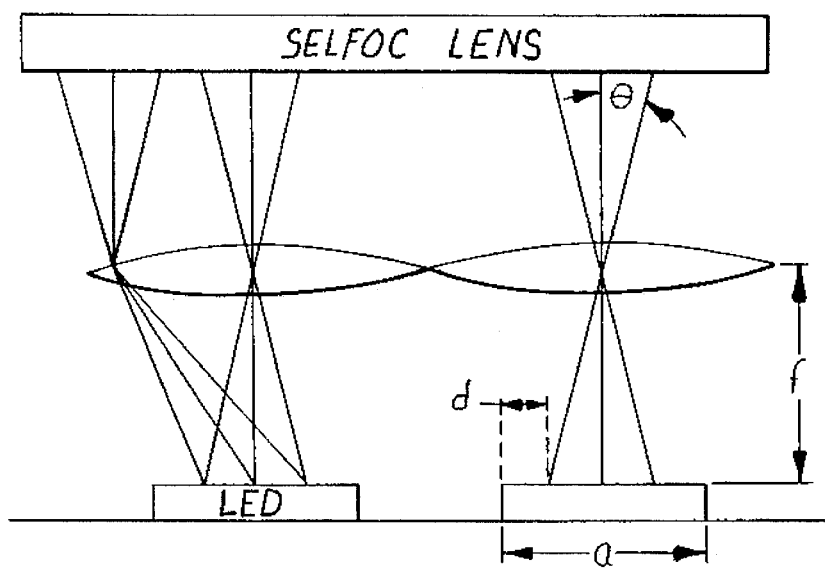

Alternatively, an LED bar having an array as in Bar A may be employed in conjunction with an array of micro lenses as shown in FIG. 5 of the accompanying drawings. The pupils of the lenses now act as the effective image pixel sources, and these can butt up against each other. The microlenses are used in conjunction with the Selfoc lenses. The optics can be designed in such a way as to allow some tolerance in the LED position.

Each LED is positioned at the focus of a micro lens. All points in the pupil of the lens radiate light over a cone which should match the acceptance angle of the Selfoc lenses (20 degrees for SLA20). As the width of the LED is increased, the cone angle increases. Thus, by making the LED larger than required some tolerance on the LED position may be attained. As shown by FIG. 5 the LED can move by a distance "d" before the energy collected by the Selfoc lens starts to decrease. The tolerance depends on two things—the focal length of the micro lenses, and the width of the LEDs.

$$d = a_{1/2} - f \tan \theta$$

Tolerance on LED position= +/−d f= focal length of micro lens a= width of LED

θ= acceptance angle of Selfoc lens

For a given tolerance, the wider the LEDs the longer the micro lens focal length. It is easier to make micro lenses with long focal lengths, so the LEDs should be as wide as possible with respect to their spacing. For example, for a 300 dpi bar with 65 micron wide pixels a micro lens focal length of 75 microns is required to obtain an LED positioning tolerance of +/−5 microns.

The added benefit of this method is that chip to chip spacing errors are also masked. The spacing of the pixel images is determined by the micro lens spacing (not the LED spacing), and now depends on the uniformity of the lens array. Thus, the accuracy of the chip placement specification must now ensure that the LEDs remain aligned with the lens array across the entire width of the bar. The placement of each chip must now be accurate with respect of an absolute reference point, rather than with respect to adjacent chips.

If the micro lenses are spherical there is positioning latitude both along and perpendicular to the line of LEDs. However, the latitude in the perpendicular direction is not required and so the lenses may be cylindrical as shown in FIG. 6 of the accompanying drawings and may be easier to fabricate.

Figure 6:
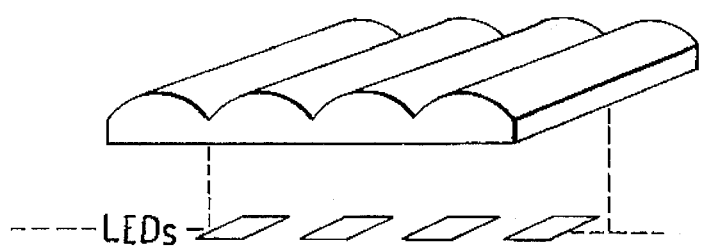
Figure 7:
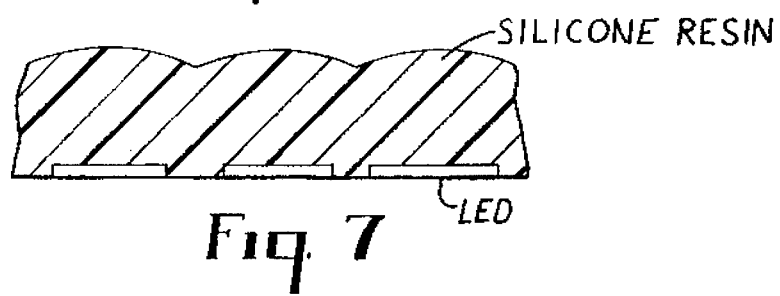

The microlenses may be formed directly over the LED array, e.g., by casting a silicone resin as shown in FIGS. 6 and 7 of the accompanying drawings.

The microlenses may take a variety of forms, e.g., conventional convex lenses, fresnel lenses, diffraction lenses, gradient index lenses and silicone lenses 'potted' to the LEDs.

It is possible that LED spacing errors may be corrected in software as part of the LED intensity correction procedure. The exposure time of a pair of LEDs which are too close together would be reduced to compensate for the greater energy density which they produce on the film. For example, using a Sanyo 7301B LED bar having 300 dpi and a normal LED spacing of 85 µm it was possible to compensate for a 15 µm error in spacing between two adjacent LEDs, actual spacing 70 µm, by adjusting the exposure. Using 3M SX560 film as the recording medium it was found a reduction in exposure from 310 µs to 280 µs compensated for the greater energy density which was produced by the spacing error.

What is claimed is:

1. An apparatus for imaging continuous tone images on a photosensitive medium, said continuous tone images having a plurality of image pixels, each of said image pixels having a dimension, said photosensitive imaging medium being capable of developing a transmission density in imaged areas that varies non-linearly with an exposure energy received by said imaged areas and having a spatial resolution finer than said dimension of said plurality of image pixels, said apparatus comprising:

a linear array of evenly spaced apart light emitting diodes;

a linear array of microlenses, each of said microlenses having a focus with a focal length, each of said microlenses abutting another of said microlenses, and each of said microlenses being associated with one of said light emitting diodes, said one of said light emitting diodes being positioned at said focus of one of said plurality of microlenses; and a gradient index lens array operatively coupled to said linear array of microlenses and arranged such that each of said microlenses acts as an effective exposure image pixel source for said gradient index lens array, wherein each of said light emitting diodes has a width, said gradient index lens array has an acceptance angle, and said light emitting diodes and said microlenses are arranged such that the expression:

$$a/2 - f \tan \theta$$

in which:

f is said focal length of each of said microlenses,

θ is said acceptance angle of said gradient index lens array, and a is said width of one of said light emitting diodes, greater than zero.

2. An apparatus for imaging continuous tone images as in claim 1 wherein said gradient index lens array has a magnification of + 1.

3. An apparatus for imaging continuous tone images as in claim 2 in which said microlenses are formed from a material cast over said light emitting diodes.

4. An apparatus for imaging continuous tone images as in claim 3 in which said material cast over said light emitting diodes is a silicone resin.

5. An apparatus for imaging continuous tone images on a photosensitive medium, said apparatus comprising:

a linear array of evenly spaced apart light emitting diodes;

a linear array of microlenses, each of said microlenses having a focus with a focal length, each of said microlenses abutting another of said microlenses, and each of said microlenses being associated with one of said light emitting diodes, said one of said light emitting diodes being positioned at said focus of one of said plurality of microlenses; and a gradient index lens array operatively coupled to said linear array of microlenses .and arranged such that each of said microlenses acts as an effective exposure image pixel source for said gradient index lens array, wherein each of said light emitting diodes has a width, said gradient index lens array has an acceptance angle and a focal length, and said light emitting diodes and said microlenses are arranged such that each of said microlenses is spaced from one of said light emitting diodes by a distance equal to said focal length of one of said microlenses, such that the expression:

$$a/2 - f \tan \theta$$

in which:

f is said focal length of each of said microlenses,

θ is said acceptance angle of said gradient index lens array, a is said width of one of said light emitting diodes, is greater than zero.

* * * * *